US007801133B2

(12) United States Patent
Siegel

(10) Patent No.: US 7,801,133 B2
(45) Date of Patent: Sep. 21, 2010

(54) SECURE NETWORK-ROUTED VOICE MULTICAST DISSEMINATION

(75) Inventor: Neil G. Siegel, Rancho Palos Verdes, CA (US)

(73) Assignee: Northrop Grumman Corporation, Los Angeles, CA (US)

( * ) Notice: Subject to any disclaimer, the term of this patent is extended or adjusted under 35 U.S.C. 154(b) by 1478 days.

(21) Appl. No.: 10/295,274

(22) Filed: Nov. 14, 2002

(65) Prior Publication Data

US 2004/0095900 A1    May 20, 2004

(51) Int. Cl.
    H04L 12/56    (2006.01)
(52) U.S. Cl. .................. 370/390; 370/401; 370/432
(58) Field of Classification Search ............ 370/310, 370/328, 338, 343, 351, 389, 390, 391, 400, 370/401, 329, 352, 254, 255, 432; 375/132
    See application file for complete search history.

(56) References Cited

U.S. PATENT DOCUMENTS

| | | | |
|---|---|---|---|
| 4,578,815 A | | 3/1986 | Persinotti |
| 4,771,438 A | * | 9/1988 | Nash ........................ 375/235 |
| 4,829,588 A | * | 5/1989 | Keyser ........................ 455/21 |
| 5,341,375 A | * | 8/1994 | Buchholz et al. ............ 370/349 |
| 5,712,860 A | * | 1/1998 | Hardin ........................ 714/748 |
| 5,761,619 A | * | 6/1998 | Danne et al. ............ 455/422.1 |
| 6,111,860 A | | 8/2000 | Braun |
| 6,119,179 A | | 9/2000 | Whitridge et al. |
| 6,147,970 A | * | 11/2000 | Troxel ........................ 370/235 |
| 6,212,559 B1 | * | 4/2001 | Bixler et al. ................ 709/221 |
| 6,259,691 B1 | | 7/2001 | Naudus |
| 6,272,134 B1 | * | 8/2001 | Bass et al. ................... 370/390 |
| 6,298,062 B1 | | 10/2001 | Gardell et al. |
| 6,327,267 B1 | | 12/2001 | Valentine et al. |
| 6,330,316 B1 | | 12/2001 | Donak et al. |
| 6,373,829 B1 | * | 4/2002 | Vilmur ........................ 370/335 |
| 6,374,109 B1 | * | 4/2002 | Shaheen et al. ............ 455/434 |
| 6,577,622 B1 | * | 6/2003 | Schuster et al. ............ 370/352 |
| 6,639,915 B1 | * | 10/2003 | Tsztoo et al. ................ 370/392 |
| 2002/0126698 A1 | * | 9/2002 | Deshpande .................. 370/467 |
| 2002/0150098 A1 | * | 10/2002 | Sharony ..................... 370/390 |
| 2003/0021286 A1 | * | 1/2003 | Boscovic et al. ............ 370/431 |
| 2003/0083087 A1 | * | 5/2003 | Ekl et al. ..................... 455/518 |
| 2003/0095523 A1 | * | 5/2003 | Korus et al. ................. 370/338 |
| 2003/0148779 A1 | * | 8/2003 | Aravamudan et al. ....... 455/519 |
| 2003/0161287 A1 | * | 8/2003 | Venkitaraman et al. ..... 370/338 |
| 2003/0178984 A1 | * | 9/2003 | Lansford et al. ............ 324/132 |
| 2006/0015674 A1 | * | 1/2006 | Murotake .................... 711/101 |
| 2007/0242687 A1 | * | 10/2007 | Limb et al. .................. 370/443 |

* cited by examiner

*Primary Examiner*—Jason E Mattis
(74) *Attorney, Agent, or Firm*—Tarolli, Sundheim, Covell & Tummino LLP

(57) ABSTRACT

Systems and methods are provided for routing voice communications to groups in a voice communication system. The voice communication system can be a mobile communication system having a plurality of members grouped as logical networks and/or unit task organizations. One or more routers are provided in the system. The one or more routers extract routing information from received voice messages. The routing information is used with a router database to determine which identified group to route the digitized voice packets. The one or more routers can be adapted to receive and route voice communications to different radio types across different logical networks.

28 Claims, 10 Drawing Sheets

SECURE NETWORK-ROUTED VOICE MULTICAST DISSEMINATION

CROSS-REFERENCE TO RELATED-APPLICATIONS

This application is related to commonly assigned application Ser. No. 10/295,744 filed Nov. 14, 2002, entitled "SECURE NETWORK-ROUTED VOICE PROCESSING" and application Ser. No. 10/294,793, filed Nov. 14, 2002, entitled "VOICE HUB PROCESSING" both of which are herein incorporated by reference.

TECHNICAL FIELD

The present invention relates to communications and, more particularly, to systems and methods for routing voice messages to groups in a voice communication system.

BACKGROUND OF THE INVENTION

The use of communication systems having wireless mobile communication units has become widespread. Wireless communication systems provide several important advantages over conventional wired systems. For example, wireless communication users can communicate in locations where wired service is not available or feasible, such as remote or rugged locations. Additionally, wireless communication users have much more mobility because they do not have to connect to a fixed wired network. These and other favorable characteristics make wireless communications ideally suited for personal, business, military, search and rescue, law enforcement, and water vehicle applications.

Common approaches to providing wireless communication systems are two-way radio systems and cellular systems. Cellular systems require fixed based stations such as cell towers that are coupled to a wired network. These types of systems are not practical when the entire network needs to remain mobile. Typically, two-way radio systems contain their own self-contained infrastructure, such that all of the mobile communication units (e.g., radios, data terminals, voice/data terminals) within a network need to be programmed to similar frequencies or channels.

Despite the benefits of two-way radios, they have several drawbacks. First, two-way radios typically support only half-duplex operation, meaning that only one user can talk at a time. A user must push a "talk" button to talk to another user and if both users push their "talk" buttons at the same time, then the users cannot hear each other. The reason for this is that all participants transmit data on the same channel. Two-way radios also require that users agree upon and select a particular channel to use for a conversation. A user can only talk to others tuned to the same parameters (e.g., frequency, modulation type, cryptographic settings, frequency-hopping settings). Typically, this means that a user can only talk to others that have similar types of radio equipment. If the channel being used is lost, or cannot be used because of excessive interference, then the users must transfer to a different channel, which in practice can be difficult to do because even if an alternate channel has been previously agreed upon it is often difficult to create a reliable method for all parties to determine that the original channel is no longer available.

Two-way radio systems are often line-of-sight-type radio systems. Military line-of-sight-type radios are typically VHF (Very High Frequency) or UHF (Ultra High Frequency) radios that broadcast in frequencies from about 30 MHZ to 300 MHZ, and have effective ranges of about 5-25 miles, based on RF power, the antenna/mast height used with the radio, and other factors. These VHF/UHF radio types have limited range capabilities, but are used because these radio bands can be highly reliable. Other radio types can at times provide beyond-line-of-sight service, for example, HF (High Frequency) radios. HF radios broadcast in frequency ranges from about 1 MHZ to about 20 MHZ, and can at times achieve much longer ranges than VHF/UHF radios. However, the HF radio broadcasts are much less reliable than the VHF/UHF radio broadcasts.

Current line-of sight voice communication systems are broadcast on dedicated networks. The radios are set in frequencies that operate only in the line-of-sight, as these provide high reliability within the line-of-sight constraints. These radio types are typically push-to-talk, half-duplex systems that allow a person to talk only to other radios that are operating within the same physical network. While highly reliable within these constraints, it is highly desirable to allow direct half-duplex voice communications to occur with different groups or organizations across different logical networks.

SUMMARY OF THE INVENTION

The following presents a simplified summary of the invention in order to provide a basic understanding of some aspects of the invention. This summary is not an extensive overview of the invention. It is intended neither to identify key or critical elements of the invention nor delineate the scope of the invention. Its sole purpose is to present some concepts of the invention in a simplified form as a prelude to the more detailed description that is presented later.

The present invention relates to systems and methods for routing voice communications to select groups of a voice communication system. The voice communication system can be a mobile communication system having a plurality of members grouped as logical networks and/or unit task organizations. The voice communications are transmitted as digitized voice packets over radio frequency links. The digitized voice packets contain one or more destination addresses in addition to other routing information. The other routing information can include one or more unit task organization data sets that comprise a listing of members of one or more composite "teams", across all constituent networks, and information that identifies how they participate in the radio network (e.g., on which networks or sub-networks participate).

The unit task organization data set is employed to facilitate the creation and management of "communications lists" by each user. Additionally, the unit task organization data set is employed to facilitate the creation and management of the technical information that automatically updates the routers and processors with the necessary information to implement the routed multicast (e.g., to send the voice messages/packets to the named units in the selected data set). The communication listing can be transmitted from the transmitting member during a communication. Alternatively, a configuration manager can configure the routers by transmitting defined unit task organization data sets during configuring of the mobile communication system.

One or more routers (e.g., mobile routers) are provided in the system that receive the digitized voice packet and extract the routing information. The routing information is used in conjunction with a router database containing one or more communication lists to determine which identified group to route the digitized voice packets. The one or more routers can be adapted to receive and route voice communications to and from different radio types, communication protocols (e.g., channels, frequency hopping schemes) and security protocols (e.g., encryption, decryption) across one or more logical networks. The router database provides a router with information regarding groupings of members as one or more logical networks and/or one or more unit task organizations. The router database also provides a router with information (e.g., unit task organization data sets) regarding connections of members (e.g., mobile communication units, routers) with one or more routers, and/or connections of members with the respective router itself. The router can receive configuration information from a configuration manager periodically that defines the logical network groupings and unit task organization groupings. The router utilizes destination information in digitized voice packets and the router database to transmit voice packets (e.g., in a multicast transmission). Administrative routines are executed periodically to update the router databases with respect to router connections of the one or more routers.

In one aspect of the invention, the mobile communication system is a two-way radio communication system having a plurality of half-duplex line-of-sight radio devices configured as one or more logical networks. At least one router is provided in the mobile communication system. The at least one router can be integrated into a two-way radio device or be a stand-alone router device. The router can be mobile (e.g., mounted on a vehicle), such that the location of the entire system can be mobile. The router can be directly connected to one or more radio devices through different ports, so that the router can transmit voice messages in a multicast transmission across radio devices of different logical networks.

The present invention combines both the advantages of secure routed voice processing, with particular, highly-efficient and easy-to-administer implementation of multicast, in order to permit communications with exactly the designated set of users (no one other than a designated user can hear you talk), allows you to talk to users who are in other networks (via routing packets containing voice information), and accomplishes that routing in a highly-efficient (e.g., multicast) manner. This allows you to talk, using a minimum of network resources and bandwidth, to exactly the intended set of users, even if those users span multiple networks and have differing (and incompatible) communications equipment.

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention will become apparent from the following detailed description of the invention when considered in conjunction with the drawings.

DETAILED DESCRIPTION OF INVENTION

Figure 1:
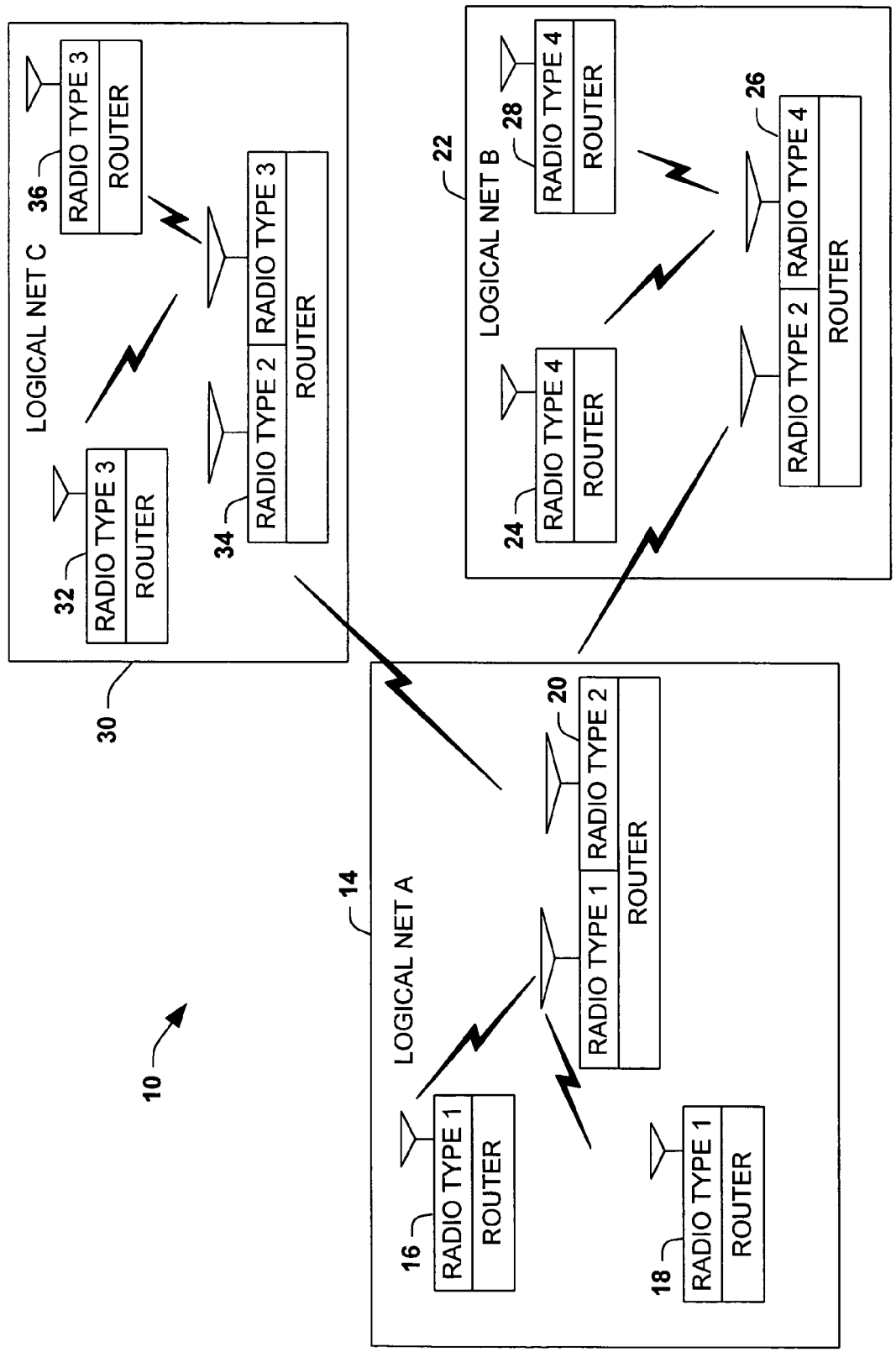
FIG. 1 illustrates a block diagram of a wireless communication system grouped as a plurality of logical networks in accordance with an aspect of the present invention.

The present invention relates to systems and methods for routing voice communications to groups in a voice communication system. The voice communication system can be a mobile communication system having a plurality of members grouped as logical networks and/or unit task organizations. The mobile communication can use mobile routers, such that the location of the entire communication system is mobile. A "unit" can be defined as a single entity in an organizational structure. The "unit task organization" is then the overall organization plan by which units are grouped and interrelated according to the tasks they perform. The unit task organization can be a configured network, a team within a network or a team across a plurality of networks forming a subnetwork.

In a military organization, units may include such entities as divisions, brigades, companies, fleets, ships, aircraft groups and so forth. Alternatively, a unit can be a group of artillery personnel residing in different divisions, brigades, companies, fleets, ships, aircraft groups within different communication networks. In a business context, units can include such entities as corporations, groups, sectors, divisions, branches, departments, and individuals with various job titles. Similarly, organizational units with other appropriate names are used in governmental and educational organizations.

The present invention provides for grouping of mobile communication units into logical networks and task unit organizations within a logical network and/or across a plurality of logical networks. The present invention also provides for configuration of routers within a voice communication system, such that voice communications can be provided to different members within the task unit organization. The voice communications can be transmitted as digitized voice packets over radio frequency links. The digitized voice packets contain one or more destination addresses. One or more routers (e.g., mobile routers) receive the digitized voice packets and extract routing information from the digitized voice packets. The routing information is used in conjunction with a router database containing communication lists that determine where to route the digitized voice packets. The one or more routers can be adapted to receive and route voice communications in a multicasting transmission to and from members in different networks and using different communication protocols.

The present invention employs a "unit task organization" data set that comprises a listing of members of one or more composite "teams", across all constituent networks, and information that identifies how they participate in the radio network (e.g., on which networks or sub-networks participate). The unit task organization data set is employed to facilitate the creation and management of "communications lists" by each user. Additionally, the unit task organization data set is employed to facilitate the creation and management of the technical information that automatically updates the routers and processors with the necessary information to implement the routed multicast (e.g., to send the voice messages/packets to the named units in the selected data set).

Many existing voice radio communications systems are efficient in reaching other users who are within their own network (in terms of the number of broadcasts required to reach all users); often, one broadcast is sufficient to reach all users within a single network. Such systems do have the significant disadvantage that all users on the network can hear you talk, even if your voice message is only intended for a subset of those users. But such voice radio communications systems cannot communicate at all with users in other networks. Many current implementations of such techniques (e.g., standard VOIP over the commercial internet) use unicast routing techniques, which are very inefficient, requiring many broadcasts of each packet in order to reach all intended users.

The present invention combines both the advantages of secure routed voice processing, with particular, highly-efficient and easy-to-administer implementation of multicast, in order to permit communications with exactly the designated set of users (no one other than a designated user can hear you talk), allows you to talk to users who are in other networks (via routing packets containing voice information), and accomplishes that routing in a highly-efficient (e.g., multicast) manner. This allows you to talk, using a minimum of network resources and bandwidth, to exactly the intended set of users, even if those users span multiple networks and have differing (and incompatible) communications equipment.

FIG. 1 illustrates a mobile voice communication system 10 in accordance with an aspect of the present invention. The present invention is particularly useful to mobile voice communication systems since members are constantly moving and task organizations are constantly changing. However, it is to be appreciated that the present invention can be implemented in other voice communication systems having members that are disposed in fixed locations. The mobile communication system 10 includes a plurality of mobile communication units (MCUs) operative to communicate with one another wirelessly via respective antennas. The mobile communication units transmit voice messages from one unit to one or more (e.g., 1 to N) of the other mobile communication units. The mobile communication units can also transmit data information (e.g., administrative data, location data, configuration data, priority data). The mobile communication system 10 can be, for example, a two-way radio communication system (e.g., a plurality of half-duplex line-of-sight radio units) configured as a self-contained radio communication system, such that the system has a self-contained infrastructure. Therefore, the system does not include a fixed base station or a wired central server.

The mobile communication system 10 includes a plurality of mobile communication units configured as logical networks. A first logical network 14 (logical network A) includes mobile communication units 16, 18 and 20. A second logical network 22 (logical network B) includes mobile communication units 24, 26 and 28. A third logical network 30 (logical network C) includes mobile communication units 32, 34 and 36. Each of the mobile communication units can be provided with built-in integrated routers. The routers are configured to allow voice communication to occur between mobile communication units within different networks, and in certain cases to only those members in a selected unit task organization or selected communication list.

For example, a voice message can be initiated at mobile communication unit 16 from logical network A. The voice message can be transmitted directly to the mobile communication unit 18 and the mobile communication unit 20, which are members of the logical network A and include a first radio type. The mobile communication unit 20 also includes a second radio of a second radio type. The router of the mobile communication unit 20 is operative to receive communications through both the first radio type and the second radio type, and convert and route that communication to either or both radios of the first radio type and the second radio type. The radios of the first radio type can be radio equipment of a different type or radio equipment of the same type but tuned to different radio parameters (e.g., different frequency hop-sets, different cryptographic variable sets, different communication protocols). Additionally, the router of the mobile communication unit 20 can be configured to receive the voice message, and route the voice message to the mobile communication 26 in logical network B, and to the mobile communication 34 in the logical network C.

The mobile communication unit 34 in logical network C includes a first radio of the second radio type and a second radio of a third radio type. The router of the mobile communication unit 34 is operative to receive communications through both the second radio type and the third radio type, and convert and route that communication to either or both radios of the second radio type and the third radio type. The mobile communication unit 26 in logical network B includes a first radio of the second radio type and a second radio of a fourth radio type. The router of the mobile communication unit 26 is operative to receive communications through both the second radio type and the fourth radio type, and convert and route that communication to either or both radios of the second radio type and the fourth radio type. The mobile communication units 20, 26 and 34 can be referred to as network interface communication units that provide communications across networks by employing at least one similar radio type. The mobile communication units 20, 26 and 34 can route voice communication from radios in other logical networks and radios within the mobile communication units respective network. For example, the mobile communication unit 26 can route communications between mobile communication units 24 and 26 and other radios in the mobile communication system through the mobile communication units 20 and 34. The mobile communication unit 34 can route communications between mobile communication unit 32 and 36 and other radios in the mobile communication system through the mobile communication units 20 and 26. The routers can route voice messages to the mobile communication units that cannot receive the voice messages directly (e.g., different logical networks, different radio types, different communication protocols). The routers can also be programmed to route voice communications between mobile communication units that are of different radio types, different frequency hop-sets and different cryptographic variable sets.

The routers can employ a unit task organization data set in the form of a router database to determine connections to the destination units, and how to route the voice data to particular mobile communication units. The unit task organization data set comprises a listing of members of one or more composite "teams", across all constituent networks, and information that identifies how they participate in the radio network. Each router can allow the creation and management of "communications lists". Alternatively, a central configuration manager can be employed to facilitate the creation of communication lists. Additionally, each router employs the unit task organization data set to retrieve technical information to automatically update the routers with the necessary information to implement the routed multicast (e.g., to send the voice messages/packets to the named units in the selected data set). The router database can also provide information regarding the particular mobile communication units within the range of the router, the radio type, and the logical network and/or unit task organization grouping that the mobile communication unit is a member. The routers can employ this information to transmit the voice data to one or more of the respective mobile communication units. A mobile communication unit can be a member of one or more networks, subnets and/or subteams.

For example, the mobile communication unit 16 can be operative to create one or more communication lists. A first communication list is created for communicating voice messages to members within the first logical network 14. A second communication list is created for communicating with a subteam (e.g., other personnel in other networks) comprised of mobile communication unit 36 in the third logical network and the mobile communication unit 28 in the second logical network 22. Once the communication lists are created, the communication lists are transmitted and routed to the routers in the mobile communication system 10. The routers then update respective router databases throughout the mobile communication system 10. The mobile communication unit 16 can then select the first communication list such that only members of the first logical network will receive voice communications from the mobile communication unit 16, for example, via a multicast transmission. The mobile communication unit 16 can then select the second communication list such that only the mobile communication units 28 and 36 will receive voice communications from the mobile communication unit 16, for example, via a multicast transmission. The communication lists can be modified or new communication lists created to adjust the sets of listenership within the mobile communication system 10.

It is to be appreciated routers can be dynamically updated to determine when a new member enters the system 10, or a new membership is created or modified. The routers are then provided with information related to parameters (e.g., radio type, frequency hop-set, cryptographic variable set, network or subnetwork address) associated with the new member, or parameters associated with the new or modified membership.

A speech pattern or voice message is provided to a microphone of a mobile communication unit, which is then amplified and converted into digitized voice data. The digitized voice data can be in the form of digitized voice packets, such as Voice Over Internet Protocol (VOIP) packets, Network Voice Protocol (NVP) packets or any other form of digitized voice or digitized speech data. Identification information is provided in the digitized voice packets, for example, in a header of the digitized voice packets. The header can contain data type, data source, data destinations, data security and data priority information. The packets can be transmitted in a multicast transmission such that they are addressed to multiple mobile communications units within different network addresses, subnet addresses and/or subteam addresses. The packets are then converted to an analog voice signal to be transmitted over the air via a radio frequency link. The analog voice signal can be modulated and transmitted over the air as modulated radio transmission waves or electromagnetic waves.

Figure 2:
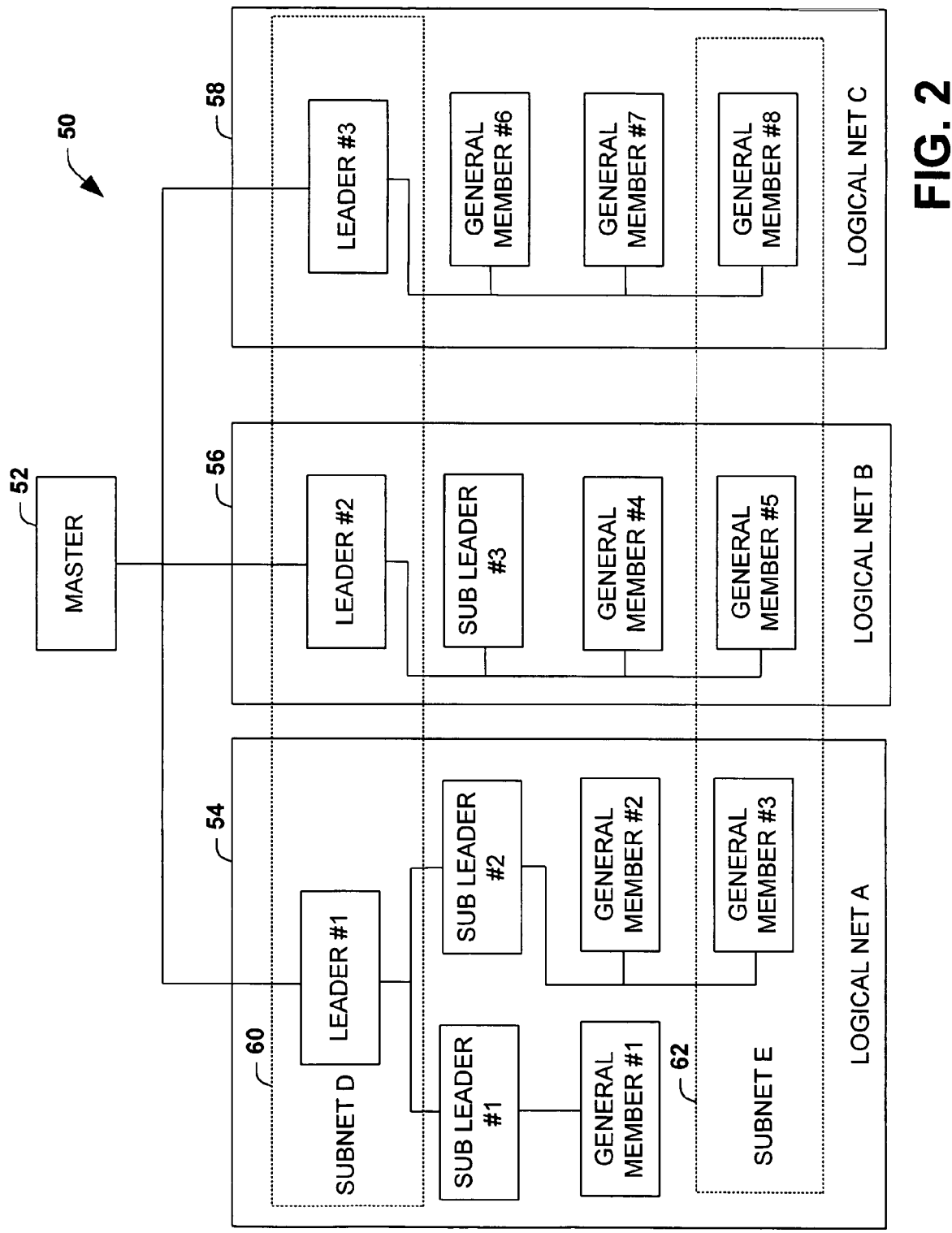
FIG. 2 illustrates an organization chart representing members of an organization.

FIG. 2 illustrates an organization chart 50 representing members of an organization. The organization chart 50 has been grouped into a plurality of communication groupings representing different unit task organizations. The organization includes a master unit 52 who can communicate to any or all of the unit task organizations. A first unit task organization 54 is grouped into a logical network A. The first unit task organization includes leader #1, subleader #1, subleader #2, general member #1, general member #2 and general member #3. A second unit task organization 56 is grouped into a logical network B. The second unit task organization 56 includes leader #2, subleader #3, general member #4, and general member #5. A third unit task organization 58 is grouped into a logical network C. The third unit task organization 58 includes leader #3, general member #6, general member #7 and general member #8.

A fourth unit task organization 60 is formed of leader #1, leader #2, and leader #3. The fourth unit task organization 60 is grouped into a communication grouping of all leaders across the different logical networks A, B, C, forming subnet or subteam D. A fifth unit task organization 62 is formed of general member #3, general member #5 and general member #8. The fifth unit task organization 62 is grouped into a communication grouping of general members across the different logical networks A, B, C, forming subnet or subteam E. The present invention allows for grouping and voice communications to occur across the different logical networks, such that different subnets or subteams can be formed.

For example, communication grouping of all the leaders can be important when the leaders are different military battalions, companies or platoons that need to communicate with one another directly. Additionally, the master unit 52 can be brigade commander who wants to speak to the subordinate commanders before commencement of an operation. The brigade commander may want to speak with all artillery personal such as formed from a communication groupings of general members of subnet E.

Communication grouping of all the leaders can be important when the leaders are different business divisions, departments or groups that need to communicate with one another directly. The master unit 52 can be a chief financial office who wants to speak to all of the vice presidents of the company. The chief financial office may want to speak with all finance or accounting personal such as formed from a communication groupings of general members of subnet E.

One or more routers are provided that allow voice communications to be transmitted across the logical networks A, B, C. Therefore, the routers provide a mechanism for communications to occur within or to different unit task organizations of a substantially larger organization. Each member in the organization can then be provided a communication unit that transmits voice messages that can be routed to one or more destination units based on the communication groupings. The routers can be preprogrammed prior to placement in the field and/or periodically programmed by a configuration manager.

Figure 3:
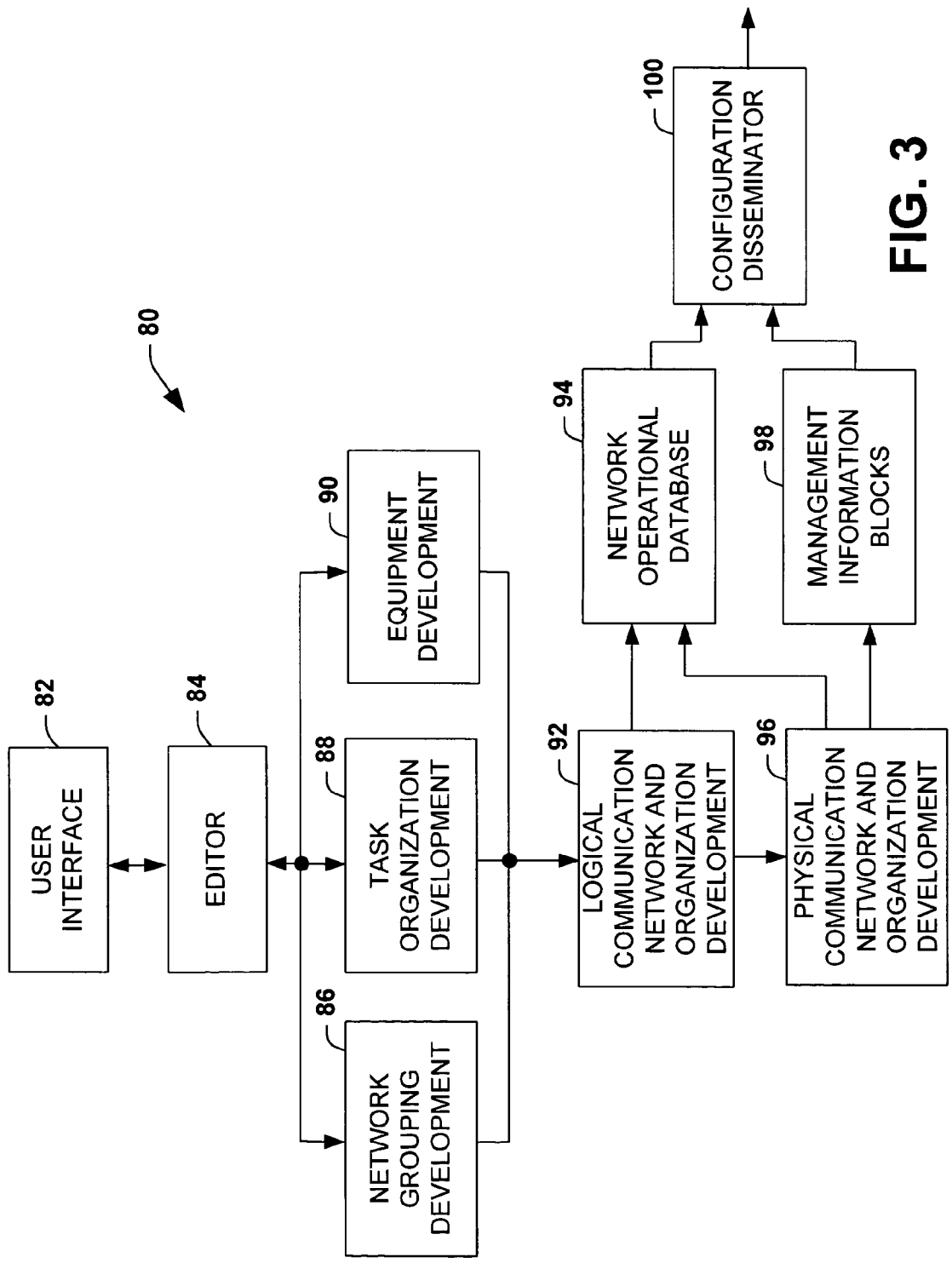
FIG. 3 illustrates a functional block diagram of a configuration system for configuring routers in accordance with an aspect of the present invention.

FIG. 3 illustrates a functional block diagram of a configuration system 80 for configuring routers in accordance with an aspect of the present invention. The configuration system 80 includes a user interface 82 coupled to an editor 84 that allows a user to define unit task organizations and logical networks. The unit task organizations can be a logical network or a subnetwork having members across one or more logical networks. The function of the user interface 82 and the editor 84 is to permit an authorized user to make configuration changes, additions to the logical communication nets and task organizations, and equipment parameters of members in the communication system.

The system 80 includes a network grouping development module 86 coupled to the editor 84. The network grouping development module 86 allows a user to define new networks and assign members to those networks. The network development module 86 also allows a user to modify logical networks among entities that will be using the network or networks being configured. The system 80 includes a task organization development module 88. The task organization development module 88 allows a user to define or modify organizational relationships among entities that will be using the network being configured.

The configuration system 80 also includes an equipment development module 90 coupled to the user interface. The equipment development module 90 can provide information relating to the communication equipment such as radio type, router type, communication protocol, frequency hop-set, and cryptographic variable set. The equipment development module 90 also establishes a relationship between each communication unit and the platform on which it functions. The platform is further defined by platform identification, platform type, equipment set identification, equipment elements and the type of unit, such as router, host, radio and so forth. The term "platform" can be used to define the working environment of a communication device. The "platform" data may pertain to a vehicle, such as an automobile, an armored tank, a ship or an aircraft. For example, a router can reside on a jeep that travels along with the entire mobile communication unit such that the router becomes mobile. Data about the jeep would then be considered platform data.

The configuration system 80 then provides the network grouping information, the task organization development information and the equipment development information to a logical communication network and organization development module 92. The logical communication network and organization development module 92 converts the logical networks developed to physical networks, using a physical communication network and organization development module 96. The physical communication network and organization development module 96 uses all input data pertaining to the network, the desired logical networks, and task organizations to derive corresponding physical network and organization parameters. Data defining both the logical and physical networks and organizations are combined to form a network operational database 94. The physical communication network and organization development module 96 also generates a set of management information blocks 98. The management information blocks contain data for reconfiguring members in the network in accordance with a new configuration.

The network operational database 94 and the management information blocks 98 are provided to a configuration disseminator 100. The configuration disseminator 100 transmits the configuration information including data from the network operational database and management information blocks to the routers. Transmission can be made in a standard format, such as the simple network management protocol (SNMP). SNMP is designed to facilitate monitoring of network bridges and routers, but the same protocol can be used in the present invention to control and program bridges and/or routers in accordance with a new configuration.

Figure 4:
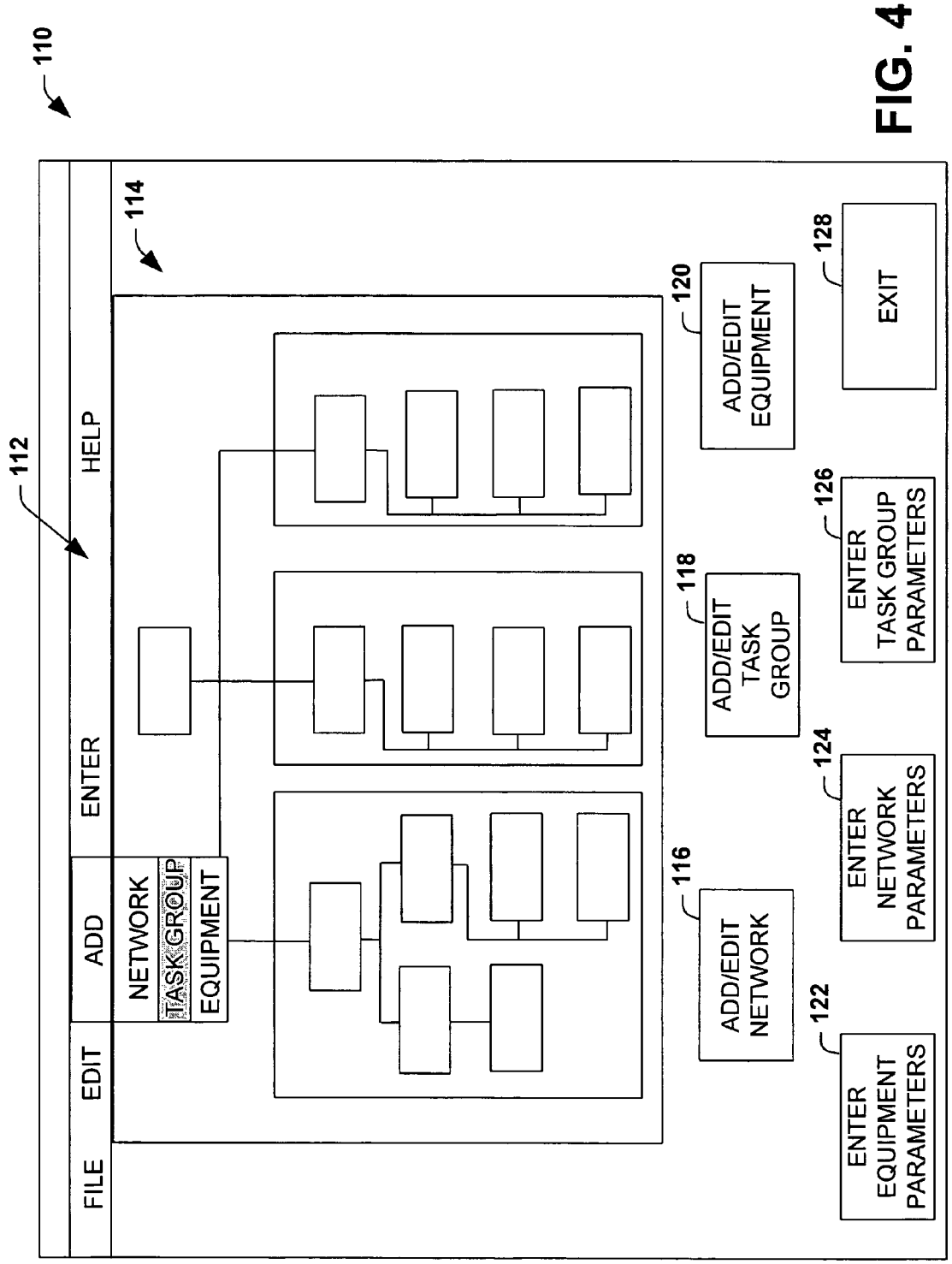
FIG. 4 illustrates an example of a possible user interface for grouping logical networks and unit task organizations in accordance with an aspect of the present invention.

FIG. 4 illustrates an example of a possible graphical user interface (GUI) 110 in accordance with an aspect of the present invention. The GUI 110 includes a tool bar menu 112, an organizational chart image 114 and a plurality of command buttons. The GUI 110 allows the user to define logical networks, new task units and to move existing logical networks and task units to new positions using a familiar "drag-and-drop" operation with a mouse or similar pointing device. Configurations that are contrary to logical network and unit task rules and restrictions are not permitted, and appropriate error messages are communicated to the user through the GUI 110.

The tool bar 112 includes pull down menus labeled as "FILE", "EDIT", "ADD", "ENTER" and "HELP". A user can load an organizational chart template from the "FILE" pull down menu, and then add/edit/delete members, group members as logical networks and/or task groups in addition to adding, defining and editing equipment definitions of members. A standard "HELP" menu is provided for assisting the users with the GUI 110.

The plurality of command buttons include an "ADD/EDIT NETWORK" button 116 that allows a user to add a logical network or edit an existing logical network. For example, the user can drag and drop members on the GUI 110, and click on the "ADD/EDIT NETWORK" button 116 to create a new logical network. Alternatively, the user can click on an existing network to modify or delete that network by clicking on the "ADD/EDIT NETWORK" button 116. Other menus (not shown) can be provided to customize the creation and/or editing of a logical network. The GUI 110 also includes an "ADD/EDIT TASK GROUP" button 118 for adding and/or editing task groups, and an "ADD/EDIT EQUIPMENT" button 120 for adding or editing equipment.

The command buttons also include an "ENTER EQUIPMENT PARAMETERS" button 122, an "ENTER NETWORK PARAMETERS" button 124, and an "ENTER TASK GROUP PARAMETERS" button 126. The buttons 122, 124 and 126 allow a user to enter certain parametric information about the networks, the task groups and the equipment employed in the communication system. An "EXIT" button 128 is provided that allows the user to exit the graphical user interface. The same functionality provided by the command buttons can also be implemented through the tool bar 112.

Figure 5:
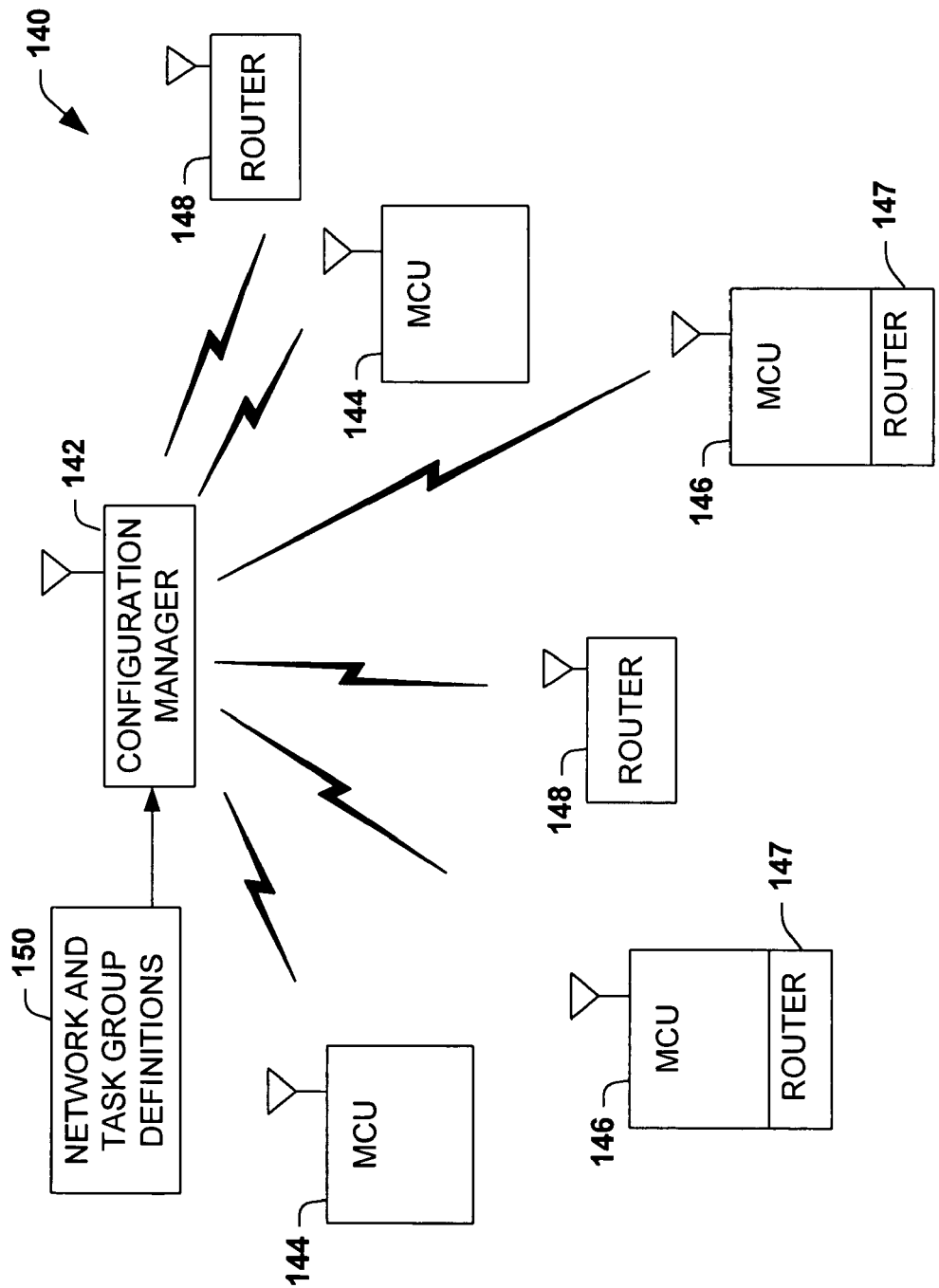
FIG. 5 illustrates a block diagram of a wireless communication system having a configuration manager in accordance with an aspect of the present invention.

FIG. 5 illustrates a mobile communication system 140 utilizing a configuration manager 142 in accordance with an aspect of the present invention. The configuration manager 142 utilizes a network and task group definitions component 150 to program one or more routers in the mobile communications system 140. The network and task group definitions component 150 define the network groupings and unit task organization groupings of the mobile communication system 140. The configuration manager 142 transmits this information to the routers and the routers generate a router database defining routing connection lists that are used to transmit voice messages to grouped communication units.

The mobile communication system 140 includes a plurality of mobile communication units (MCU) operative to transmit voice signals wirelessly via respective antennas. The mobile communication units can also transmit data information (e.g., administrative data, location data, configuration data, priority data). The mobile communication system 140 can be, for example, a two-way radio communication system configured as a self-contained radio communication system, such that the system has a self-contained infrastructure.

The mobile communication system 140 includes a plurality of mobile communication units 146 having built-in routers 147, a plurality of stand-alone mobile communication units 144 and a plurality of stand-alone routers 148. The plurality of mobile communication units 146 and the plurality of stand-alone routers 148 can include one or more radio types, so that communications can occur between different radio equipment and across different logical networks. The configuration manager 142 programs the routers to facilitate routing of voice messages between groupings of mobile communication units defined as unit task organizations and/or defined logical nets. The configuration manager 142 transmits configuration messages to the routers periodically. The configuration messages contain information defining the network groupings and unit task groupings. The definition of the network groupings and unit task groupings can include, for example, communication lists and identifiers, network member identifiers, the physical location of the members, the relationship between the physical and logical addresses and the interconnection path between the members.

The physical address is a unique numerical or other code that uniquely defines the member and the local network to which it is associated. The logical address is usually a name or label associated with the member or the person using it. The logical address, which may include a person's name, is the address other users employ to direct messages to the person without having to remember or look up a long and complicated physical address. The configuration messages also contain information relating to member types (e.g., radio types, router types), communication characteristics (e.g., different frequency hop-sets), member security information (e.g., cryptographic variable sets), member and task priority information, network parameters, equipment parameters, unit task organization parameters and configuration timing information.

Once configured, the routers 147 and 148 are programmed to generate a router database or member connection list(s), and employ the router database or member connection list(s) in routing voice messages from one mobile communication unit to other mobile communication units and/or routers. The router database can include members connectable by the router and/or all routers in the mobile communication system. Additionally, the routers 147 and 148 are programmed to perform administration updates (e.g., a dynamic routing protocol) based on movement of members and location of the member with respect to the routers. The administrative updates can be transmitted between the routers, such that the routers can update their respective router databases.

The routers 147 and 148 can also determine optimal transmission paths to route the voice message to desired receivers, for example, through other routers and/or mobile communication units. The optimal transmission paths can be provided using statistical modeling, decision modeling, bayesian modeling or other decision techniques. The optimal transmission path can be based on one or more parameters (e.g., time, priority, router location, mobile communication unit location, bandwidth, load sharing).

Figure 6:
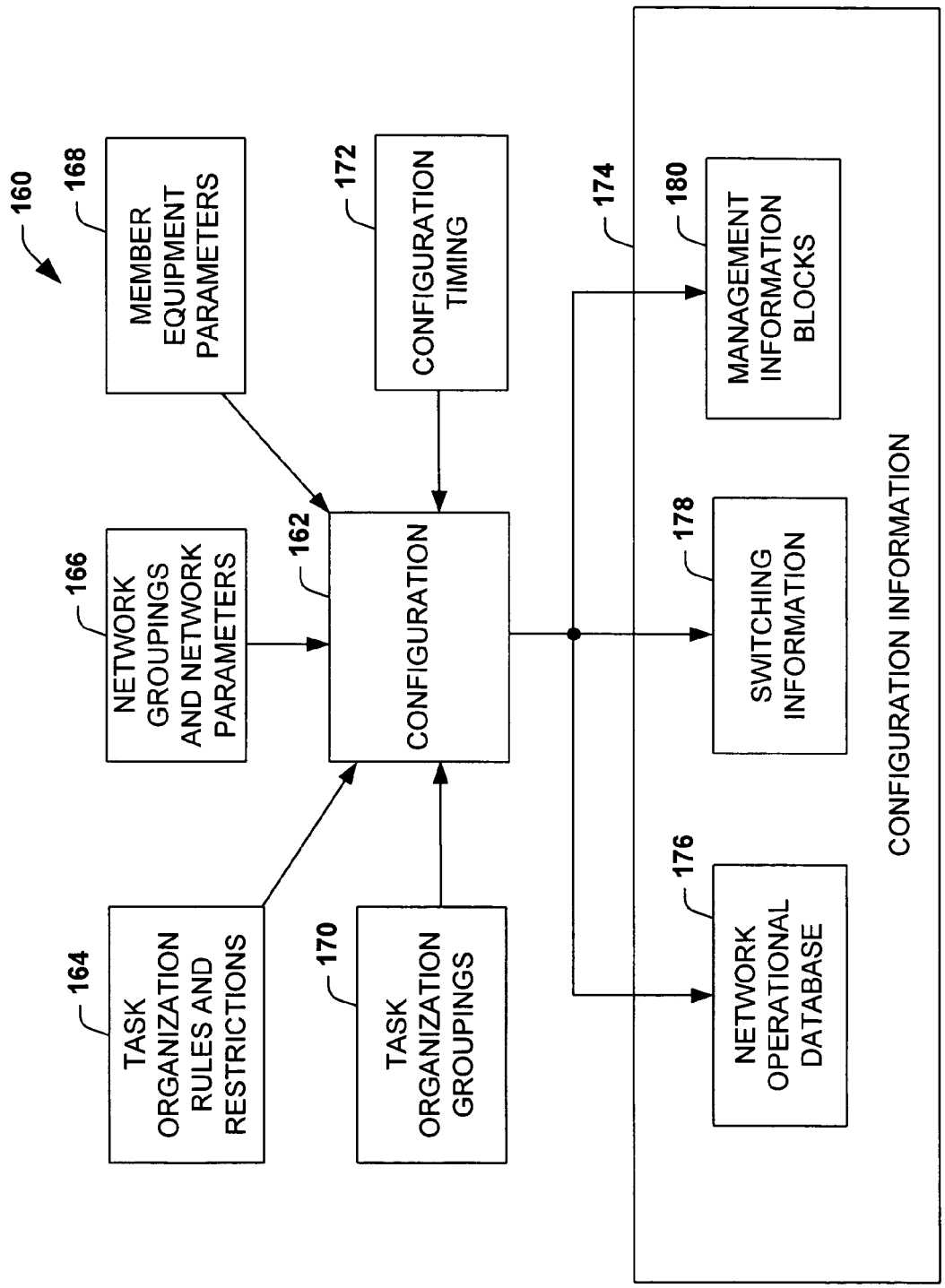
FIG. 6 illustrates a functional block diagram of a configuration manager in accordance with an aspect of the present invention.

FIG. 6 illustrates a functional block diagram of a configuration manager 160 in accordance with an aspect of the present invention. The configuration manager 160 includes a configuration component 162 that is provided one or more configuration parameters from an operator or user, and generates configuration information 174 to one or more routers. The information includes a network groupings and network parameters component 166 defining the members of the network groupings, for example, the mobile communication units or two-way radios, physical and logical address information with respect to the members, and initial network connection information with respect to each defined network. The information also includes member equipment parameters component 168 defining the member type parameters (e.g., radio types, router types, platforms), member communication parameters (e.g., channels, frequency hopping parameters), and member security parameters (e.g., encryption parameters, decryption parameters).

The configuration component 162 also receives task organization rules and restrictions 164 that define limits of groupings of unit task organizations. The information includes a task organization groupings component 170 defining the members of unit task organizations, for example, the mobile communication units or two-way radios, physical and logical address information with respect to the members, and initial connection information with respect to each defined task organization member. A configuration timing component 172 informs all of the members (e.g., routers) when to switch over to the new configuration.

The configuration component 162 then generates the configuration information 174. The configuration information 174 includes a network operational database 176, a set of switching information 178 and a set of management information blocks 180. The network operational database 176 defines the members of the networks, the unit task organization data sets, priorities and initial routing connections. The switching information 178 informs the member when it is time to switch over to the new configuration, for example, at a predetermined time or immediately. The management information blocks 180 contain data for reconfiguring members in the network in accordance with the new configuration.

Figure 7:
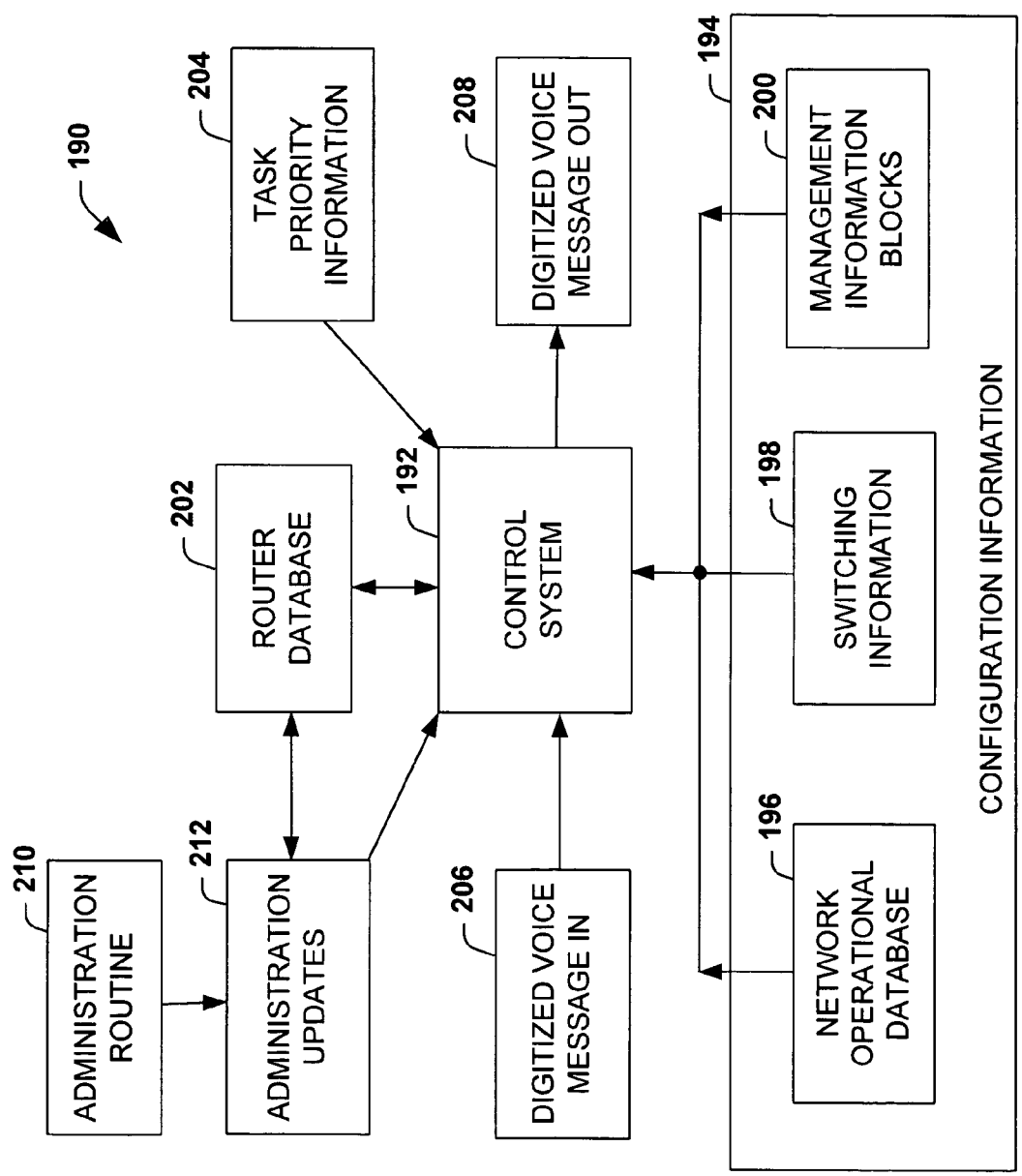
FIG. 7 illustrates a functional block diagram of a router in accordance with an aspect of the present invention.

FIG. 7 illustrates a functional block diagram of a router 190 in accordance with an aspect of the present invention. The router 190 includes a control system 192 that receives digitized voice input messages addressed to one or more mobile communication units, and provides digitized voice output messages that can contain additional routing information to assure that the voice data reaches the appropriate mobile communication units. The control system 192 receives configuration information 194 from a configuration manager. The configuration information 194 includes a network operational database 196, a set of switching information 198 and a set of management information blocks 200. The network operation database 196 defines the members of the network and/or members of the unit task organization data sets, priorities and initial network and organization connections. The switching information 198 informs the router 190 when it is time to switch over to the new connection, for example, at a predetermined time via a trigger signal or immediately upon receiving the new configuration information. The management information blocks 200 contain data for reconfiguring the router 190 in accordance with the new configuration.

The control system 192 utilizes the configuration information in creating an initial router database 202 and a task priority information set 204. The router database 202 includes information relating to routing connections to the mobile communication units within network groupings and/or unit task organization groupings, and communication parameters associated with the mobile communication units. An administration routine 210 periodically executes to determine which mobile communication units and routers are within communication range of the router 190 and provides administration updates 212 based on the determination. The administrative updates 212 also include the routing connection lists of other routers, such that optimal transmission paths can be determined for transmitting voice messages to members outside the router 190. The administrative updates 212 are provided to the router database 202 to continuously update the router 190 with information relating to members within the communication range of the router 190.

The control system 192 extracts routing information from the digitized voice input message addressed to one or more mobile communication units. For example, the routing information can include information relating to the sender of the voice message, a member list or member list number for which the voice message is intended and expected optimal paths determined by the sender. The control system 192 then determines if the desired voice message is for any device coupled to the router 190, and removes the member from the member list and provides the message in the form of digitized voice data to the coupled member. The control system 192 then determines if any of the optimal paths have changed and reconfigures the changed optimal paths. The control system 192 then reconfigures the routing information in the digitized voice message in 206, and provides the new routing information and member list in the digitized voice message out 208. The digitized voice message out 202 can then be transferred to members on the member list and additional routers if necessary. Alternatively, the voice message can be transmitted in multicast fashion.

Figure 8:
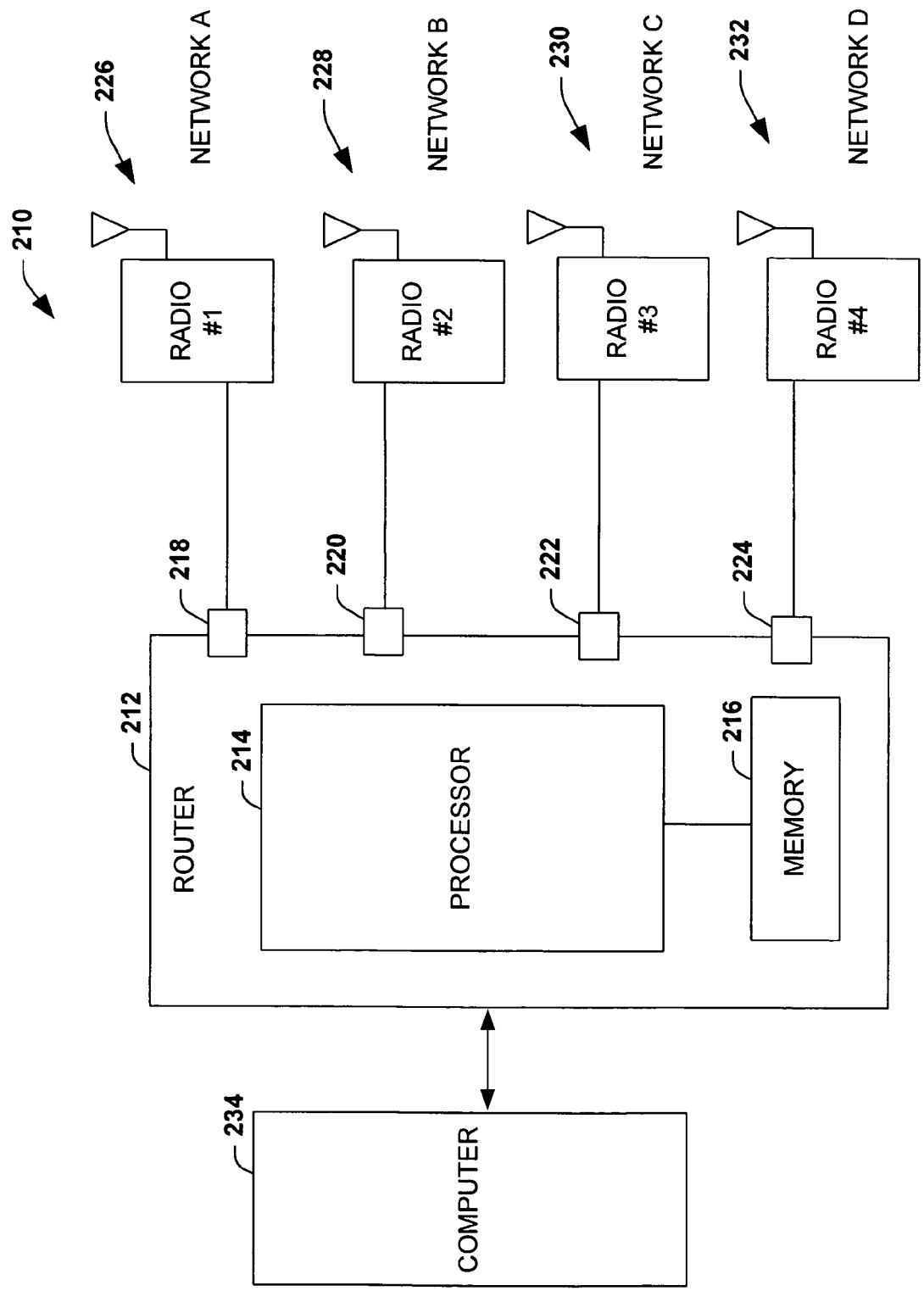
FIG. 8 illustrates a block diagram of a router system using different radio types across different logical networks in accordance with an aspect of the present invention.

FIG. 8 illustrates a block diagram of a router system 210 for a two-way radio communication system in accordance with an aspect of the present invention. The router system 210 includes a router 212 coupled to a first radio 226 through a first port 218, a second radio 228 through a second port 220, a third radio 230 through a third port 222 and a fourth radio 232 through a fourth port 224. The first port 218, the second port 220, the third port 222 and the fourth port 226 can be different port types. For example, the ports can be any of RS-232 ports, RS-422 ports, RS-485 ports, USB ports, parallel ports, IEEE standard ports and LAN connections. The first radio 210, the second radio 212, the third radio 214 and the fourth radio 216 can be radios of different types, communicating with different frequency hopping schemes, different encryption schemes, different modulation schemes using different protocols over different networks.

For example, the first radio 226 is configured to communicate within logical network A, the second radio 228 is configured to communicate within logical network B, the third radio 230 is configured to communicate within logical network C, and the fourth radio 232 is configured to communicate within logical network D. The router 212 can be programmed to receive voice communications from radio devices within a first network, and transmit that voice communications to radio devices in one or more of the other networks. For example, a voice communication can be received by the first radio 226 from a member in network A. The voice communication can be converted into digitized packets containing address source and destination information. The router can employ a router database to determine the desired destinations of the voice communications across one or more of the other networks (e.g., network B, network C, network D).

The router 212 can be programmed to route the voice data in the form of digitized packets using the address information. The radios can be adapted to convert the digitized voice packets into analog signal for transmission over their respective networks using a particular radio type, modulation scheme, frequency hopping scheme, security scheme and communication protocol understandable by those in the respective network. The destination radios can then receive the voice communication from radios in their respective networks and convert the voice communication into digitized packets understandable by the respective radio. The digitized packets can then be transformed back into the voice message and played over the destination radios.

In one aspect of the invention, the radios are half-duplex radios. Each radio can be operative to communicate with a different set of radios in a wireless network. The different set of radios can be configured to operate as subnets of an overall network. Therefore, communication from one subnet or set of radios can be transmitted to the router 212, which determines routing information within voice messages to route the voice message from one radio in a first subnet to radios in one or more other subnets.

The router 212 includes a processor 214 coupled to a memory device 216. The memory device 216 provides the processor 214 with appropriate algorithms to route voice messages from one radio subnet to one or more other radio subnets. For example, the processor 214 can be programmed to decrypt and/or decipher voice data in one protocol from a first radio type, and provide a separate encryption and protocol to the voice data to send through a second radio type. The processor 214 can also extracts routing information from the voice data and transmits the voice data to a second router system or directly to specific radios in a desired subnet. Voice packets can be queued in the memory device 216 for transmitting according to priority to multiple subnets. An optional computer 234 can be coupled to the router 212. The computer 234 can be configured to operate as a configuration system as discussed in FIG. 3.

Figure 9:
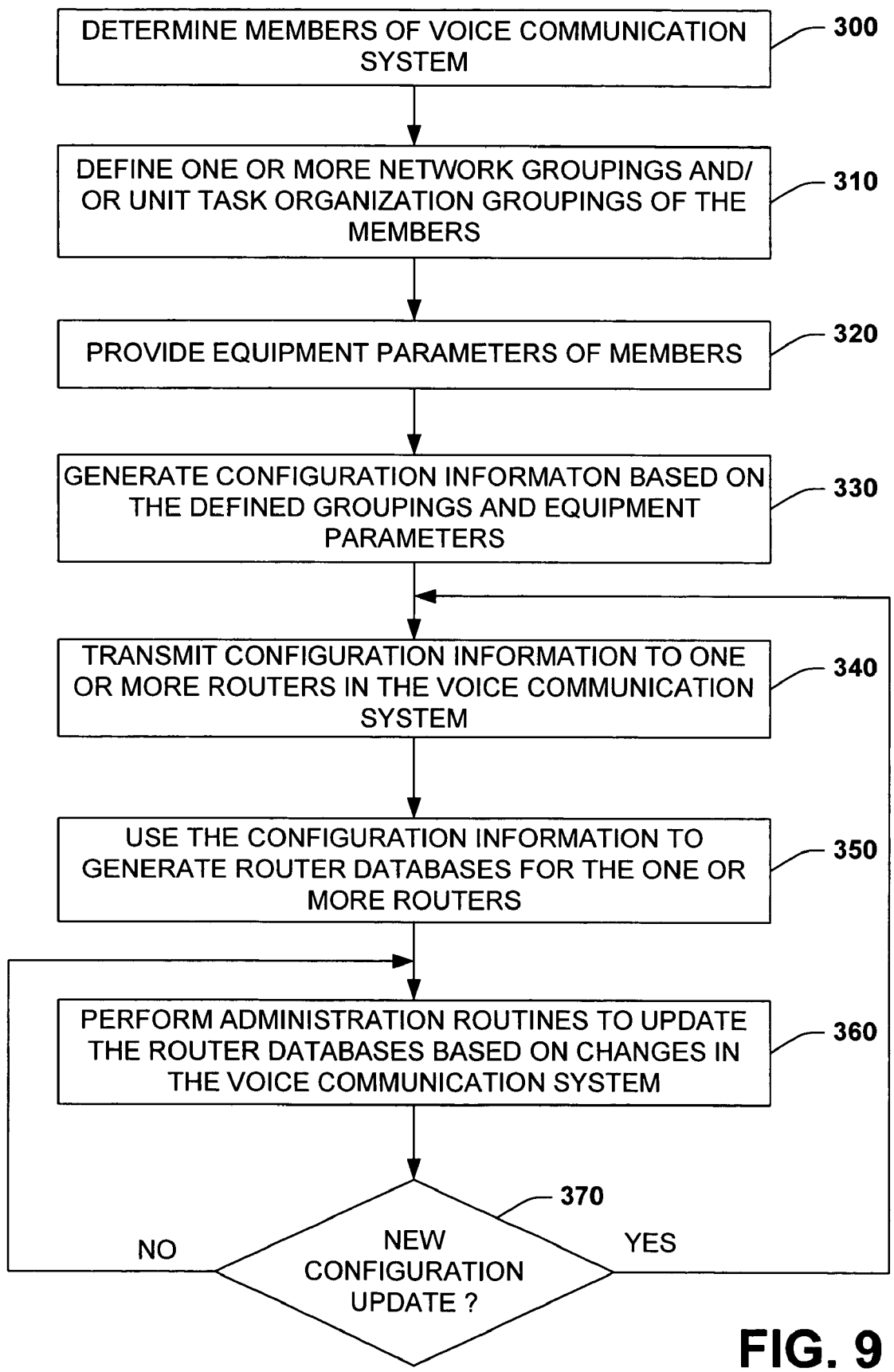
FIG. 9 illustrates a flow diagram of a methodology for configuring a wireless network system for transmitting voice communications with defined groupings in accordance with an aspect of the present invention.
Figure 10:
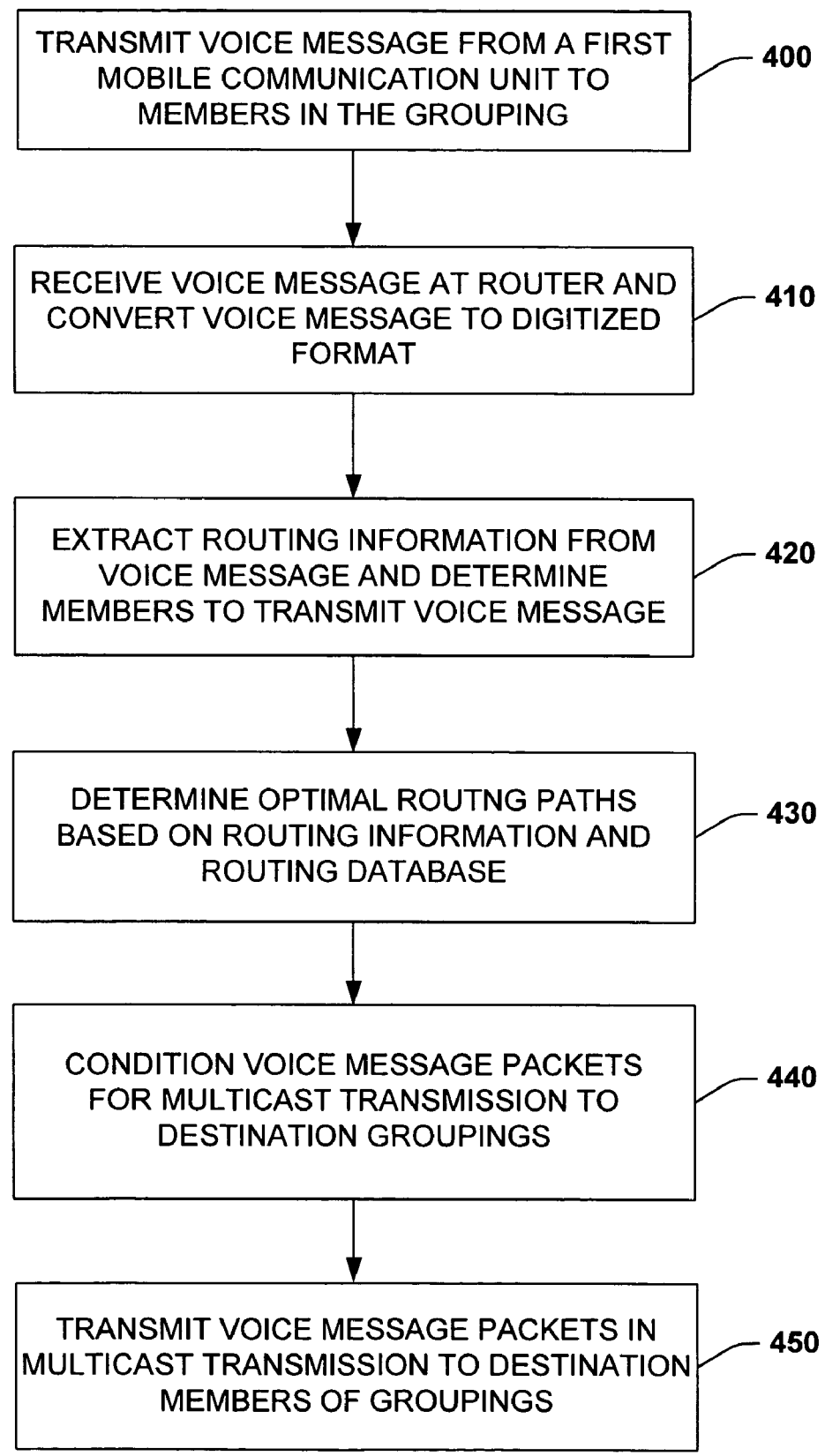
FIG. 10 illustrates a flow diagram of a methodology for transmitting voice messages in accordance with an aspect of the present invention.

In view of the foregoing structural and functional features described above, methodologies in accordance with various aspects of the present invention will be better appreciated with reference to FIGS. 9-10. While, for purposes of simplicity of explanation, the methodologies of FIGS. 9-10 are shown and described as executing serially, it is to be understood and appreciated that the present invention is not limited by the illustrated order, as some aspects could, in accordance with the present invention, occur in different orders and/or concurrently with other aspects from that shown and described herein. Moreover, not all illustrated features may be required to implement a methodology in accordance with an aspect the present invention.

FIG. 9 illustrates a methodology for configuring a voice communication system to transmit voice communication within defined groupings. The voice communication system can be a wireless network having plurality of half-duplex two-way radio devices and one or more routers configured to provide multicast transmissions to radio devices grouped as networks and/or unit task organizations. The radio devices can be operative to transmit voice messages that are digitized during processing and routed by the radios and routers. The methodology begins at 300 where a determination of members of a voice communication system is made. The determination can include determining number of radios and routers that will make up the system. The methodology then proceeds to 310.

At 310, one or more network groupings and/or unit task organization groupings of members are defined. For example, one or more networks can be defined by grouping voice communication units into logical networks. The voice communication units can also be grouped into unit task organizations across one or more logical networks. The methodology then proceeds to 320. At 320, equipment parameters of members are provided. The equipment parameters can include radio type, router type, communication protocol, frequency hop-set, cryptographic variable set, platform identification, platform type, equipment set identification, equipment elements and the type of unit, such as router, host, radio. The methodology then advances to 330.

At 330, configuration information is generated based on the defined groupings and equipment parameters. The configuration information can include operational database information defining the network groupings, unit task organization groupings, member physical and logical address information, member communication parameters and member connection information. The information can also includes router information, physical and logical address information about the routers, and any other information relating to the routers. The information can include the member type parameters (e.g., radio types), member communication parameters (e.g., channels, frequency hopping parameters), member security parameters (e.g., encryption parameters, decryption parameters), configuration timing and task and member priority information.

In one aspect of the invention, the configuration information includes a network operational database defining the members of the network, priorities, groupings and initial grouping connections, switching information that informs the routers when it is time to switch over to the new configuration and a set of management information blocks. The management information blocks contain data for reconfiguring members in the network in accordance with the new configuration.

At 340, the configuration information is transmitted to one or more routers in the voice communication system. The transmission can be made using SNMP or the like. At 350, the routers use the configuration information to generate router databases for the one or more routers. The methodology then proceeds to 360. At 360, administration routines are performed by the routers to update the router databases based on changes in the voice communication system. The administration routines provide the routers with information regarding the members (e.g., radios, routers) within the range of the respective routers. The administration routines then provide this information to the other routers, such that the routers can determine paths to route the voice messages to intended receivers (e.g., selected radios).

The methodology then advances to 370 to determine whether a new configuration update has been received. If a new configuration update has been received (YES), the methodology returns to 340 to use the configuration information to generate new routing connection lists based on the new configuration update. If a new configuration update has not been received (NO), the methodology returns to 360 to repeat the administration routines performed by the routers to update the routing connection list based on changes in the network.

FIG. 10 illustrates a methodology for transmitting voice messages in accordance with an aspect of the present invention. The methodology begins at 400 where a first voice communication unit (e.g., half-duplex two way radio) transmits a voice message to one or more (1 to N) other members (e.g., mobile communication units, half-duplex two way radios) in a grouping. At 410, the voice message is received at a router and the router converts the voice message to a digitized format. At 420, the router extracts routing information from the digitized voice message (e.g., voice packets forming the voice message). The router determines the destination members or groupings to transmit the voice message. The methodology then proceeds to 430.

At 430, the router determines optimal routing paths of the voice message based on routing information and the router database residing in the router itself. Other considerations can be employed based on one or more parameters (e.g., time, priority, router location, mobile communication unit location, bandwidth, load sharing). The methodology then advances to 440. At 440, the router conditions the voice message packets, for example, for multicast transmissions to destination members based on the destination group and/or various member communication formats. At 450, the voice message packets are transmitted in a multicast transmission to destination members based on the destination group. The multicast transmission can include buffering voice packets in different formats (e.g., radio formats, communication formats) and transmitting the voice packets through different routing paths (e.g., different routers, different networks).

What has been described above includes exemplary implementations of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

The invention claimed is:

1. A wireless voice communication system comprising:
a router that receives a voice message and extracts routing information from the voice message, the routing information being used in conjunction with a router database that defines logical network groupings of a plurality of mobile communication units and at least one unit task organization of the plurality of mobile communication units, the router transmitting the voice message to members in the at least one unit task organization, based on the routing information and the router database, by employing a first wireless transmitter, which is coupled with the router, for sending the voice message to a first member of the unit task organization according to a first communication parameter and by employing a second wireless transmitter, which is coupled with the router, for sending the voice message to a second member of the unit task organization according to a second communication parameter, the voice message being sent to the first and second members concurrently, the first member being a different radio type having one of a different frequency hopping scheme, a different communication protocol, a different modulation scheme, and a different cryptographic variable set than the second member.

2. The system of claim 1, the plurality of mobile communication units being a plurality of two-way radio devices.

3. The system of claim 2, the two-way radio devices being line-of-sight radio devices.

4. The system of claim 1, the at least one task unit organization formed of mobile communication units associated with a plurality of different logical networks.

5. The system of claim 1, the voice message being transmitted in a multicast transmission to only members in the at least one selected unit task organization.

6. The system of claim 1, the router determines at least one routing path for the voice messages based on at least one of time, priority, router location, mobile communication unit location, bandwidth and load sharing.

7. The system of claim 1, further comprising a configuration manager that disseminates configuration information to the router, the configuration information defining logical networks, unit task organizations and equipment parameters, the router utilizing the configuration information to create the router database defining communication requirements and routing connections for routing the voice messages.

8. The system of claim 7, the configuration manager provides logical network groupings and task organization groupings and converts the logical network groupings and task organization groupings to physical network groupings and task organization groupings.

9. The system of claim 8, the configuration manager provides a network operational database and a set of management information blocks using the physical network groupings and task organization groupings, the network operational database defining logical network grouping connections and task organization grouping connections and the management information blocks having data for reconfiguring the router database.

10. The system of claim 7, further comprising a graphical user interface that allows a user to group members into logical networks and unit task organizations and provides information to the configuration manager relating to the groupings.

11. The system of claim 1, the router performs administrative updates to update the router database and determine if new members have entered the system.

12. The system of claim 1, wherein the first communication parameter is different than the second communication parameter, such that the first member can process the digitized voice packets that are transmitted based on the first communication parameter but cannot process the digitized voice packets that are transmitted based on the second communication parameter, and such that the second member can process the digitized voice packets that are transmitted based on the second communication parameter but cannot process the digitized voice packets that are transmitted based on the first communication parameter.

13. A two-way radio communication system comprising:
a router that contains a router database defining logical network groupings of members of a plurality of two-way radio devices and task organization groupings of members of the plurality of two-way radio devices, the router having a routing algorithm that extracts routing information from digitized voice packets and utilizes the extracted routing information from the router database to transmit the digitized voice packets to a plurality of destination two-way radio devices based on the groupings by employing a first transmitter, which is coupled with the router, to transmit the digitized voice packets to a first destination two-way radio device based on a first communication parameter and by employing a second transmitter, which is coupled with the router, to transmit the digitized voice packets to a second destination two-way radio device based on a second communication parameter, the digitized voice packets being sent to the first destination two-way radio device and the second destination two-way radio device concurrently, and wherein the first communication parameter is different than the second communication parameter, such that the first destination two-way radio device can process the digitized voice packets that are transmitted based on the first communication parameter but cannot process the digitized voice packets that are transmitted based on the second communication parameter, and such that the second destination two-way radio device can process the digitized voice packets that are transmitted based on the second communication parameter but cannot process the digitized voice packets that are transmitted based on the first communication parameter.

14. The system of claim 13, the plurality of two-way radio devices being a plurality of half-duplex line-of-sight two-way radio devices.

15. The system of claim 14, the plurality of half-duplex line-of-sight two-way radio devices operative to transmit data information and priority information in addition to digitized voice packets.

16. The system of claim 13, the router having a plurality of different ports that provide connections to different two-way radio communication links through different two-way radio devices, the different two-way radio devices, including the first transmitter and the second transmitter, being members of different logical networks.

17. The system of claim 13, the router having a routing path algorithm that determines a routing path for the voice packets based on at least one of time, priority, router location, mobile communication unit location, bandwidth and load sharing.

18. The system of claim 13, the router having an algorithm that receives configuration information and generates the router database defining logical network groupings, unit task organization groupings, and router connections to two-way radio devices in the system, the router using the router database with information in the digitized voice packets to route the digitize voice packets.

19. The system of claim 13, the router having an algorithm that performs administrative updates to the router database to determine if new members have entered the system.

20. The system of claim 13, the digitized voice packets being one of Voice Over Internet Protocol packets and Network Voice Protocol packets.

21. The system of claim 13, wherein the first destination two-way radio device is a different radio type having one of a different frequency hopping scheme, a different communication protocol, a different modulation scheme and different cryptographic variable set than the second two-way radio device.

22. A half duplex two-way radio communication system comprising:
a plurality of half-duplex two-way radio devices having means for wirelessly transmitting digitized voice packets;
means for grouping the plurality of half duplex two-way radio devices into logical networks and task unit organizations;
means for routing the digitized voice packets by employing at least a first transmitter to send the digitized voice packets to a first of the plurality of half-duplex two-way radio devices based on a first communication parameter and a second transmitter to send the digitized voice packets to a second of the plurality of half-duplex two-way radio devices based on a second communication parameter, the digitized voice packets being transmitted to the first and second of the plurality of half-duplex two-way radio devices concurrently, wherein the first communication parameter is different than the second communication parameter;
means for configuring the means for routing to provide the means for routing with a router database defining member groups;
means for updating the router database based on changes in the system; and
means for determining routing paths based on the router database and routing information in the digitized voice packets.

23. A wireless voice communication system comprising:
a first router that receives a voice message and extracts routing information from the voice message, the routing information being used in conjunction with a router database that defines logical network groupings of a plurality of mobile communication units and at least one unit task organization of the plurality of mobile communication units, the router transmitting the voice message to members in the at least one unit task organization by employing a first wireless transmitter for sending the voice message to a first member according to a first communication parameter and by employing a second wireless transmitter for sending the voice message to a second member according to a second communication parameter, the voice message being sent to the first and second members concurrently; and at least one second router that is operative to receive the voice message directly from the first wireless transmitter according to the first communication parameter, the second router transmitting the received voice message to members in the at least one unit task organization by employing at least one of a third wireless transmitter for sending the voice message to a third member according to the first communication parameter and a fourth wireless transmitter for sending the voice message to a fourth member according to a third communication parameter.

24. The system of claim 23, wherein the second router sends the voice message to the third and fourth members concurrently.

25. The system of claim 23, wherein at least one of the first and second routers is operative to determine an optimal transmission path to route the voice message from the first router to the third member.

26. The system of claim 23, wherein the plurality of mobile communication units are configured as a self-contained mobile network infrastructure, the router database defining connections to members of the self-contained mobile network infrastructure.

27. The system of claim 26, wherein the voice message is transmitted in a multicast transmission to only members in at least one selected unit task organization.

28. A wireless voice communication system comprising:
a first mobile communication unit comprising:
a first radio of a first radio type capable of sending a voice message according to a first communication parameter;
a second radio of a second radio type capable of sending the voice message according to a second communication parameter; and
a router that receives a voice message and extracts routing information from the voice message, the router being coupled with the first radio through a first port and being coupled with the second radio though a second port, the routing information being used in conjunction with a router database that defines logical network groupings of a plurality of mobile communication units and at least one unit task organization of the plurality of mobile communication units, the router communicating the voice message to members in the at least one unit task organization, based on the routing information and the router database, by employing the first radio for sending the voice message to at least a first member according to the first communication parameter and by employing the second radio for sending the voice message to at least a second member according to the second communication parameter; and
at least a second mobile communication unit that comprises a third radio of the first radio type capable of receiving the voice message directly from the first radio, and a fourth radio of a radio type that is different from the first radio type capable of sending the voice message according to a communication parameter that is different from the first communication parameter.

* * * * *